M. C. SCHWEINERT.
GAGE FOR GAS ENGINES OR THE LIKE.
APPLICATION FILED JUNE 3, 1911. RENEWED DEC. 3, 1919.

1,352,637.

Patented Sept. 14, 1920.

WITNESSES:
Fred White
René Bruine

INVENTOR:
Maximilian Charles Schweinert,
By Attorneys,

UNITED STATES PATENT OFFICE.

MAXIMILIAN CHARLES SCHWEINERT, OF WEST HOBOKEN, NEW JERSEY.

GAGE FOR GAS-ENGINES OR THE LIKE.

1,352,697.          Specification of Letters Patent.     Patented Sept. 14, 1920.

Application filed June 3, 1911, Serial No. 631,059. Renewed December 3, 1919. Serial No. 342,267.

*To all whom it may concern:*

Be it known that I, MAXIMILIAN CHARLES SCHWEINERT, a citizen of the United States, residing in West Hoboken, in the county of Hudson and State of New Jersey, have invented certain new and useful Improvements in Gages for Gas-Engines or the like, of which the following is a specification.

This invention relates to gages for gas engines or other purposes and aims to provide certain improvements therein.

In the use of gas engines especially it is very frequently desirable to ascertain the degree of pressure of the gaseous mixture at its point of highest compression. This degree of compression determines to a large extent the effective power which is obtained from the engine, and if through the wearing of the cylinder or the use of worn or imperfect piston rings this compression is decreased, a serious loss in power is entailed. Not only is it desirable, especially with gasolene engines, to obtain an indication of the highest pressure in the cylinder, but it is also desirable to test the capacity of the cylinder for maintaining such pressure. As the device finds its chief field of usefulness in connection with automobile engines, I have devised a construction in which the connection between the gage and cylinder is in the form of a removable coupling, and I so construct the gage proper that it is not only applicable for use in this connection but is also adapted for testing the pressures of pneumatic tires. The invention also includes certain other features of improvement which will be hereinafter referred to.

Referring to the accompanying drawings which illustrate one form of the invention,—

Figure 1:
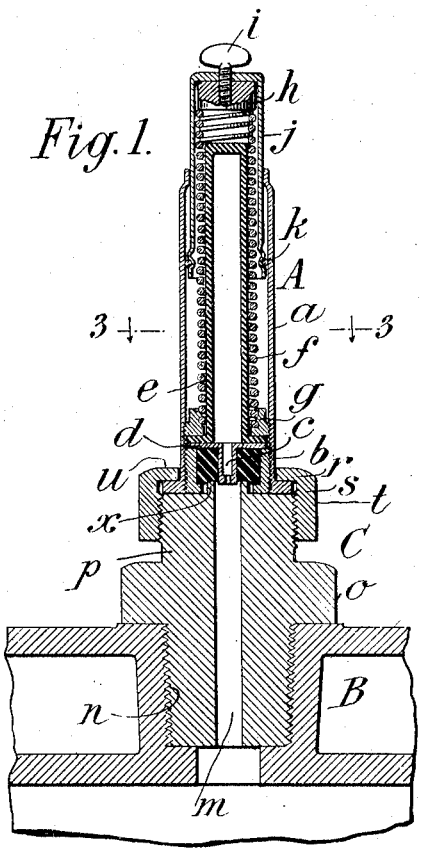
Figure 1 is a sectional view of my invention as applied to a cylinder of a gas engine.
Figure 2:
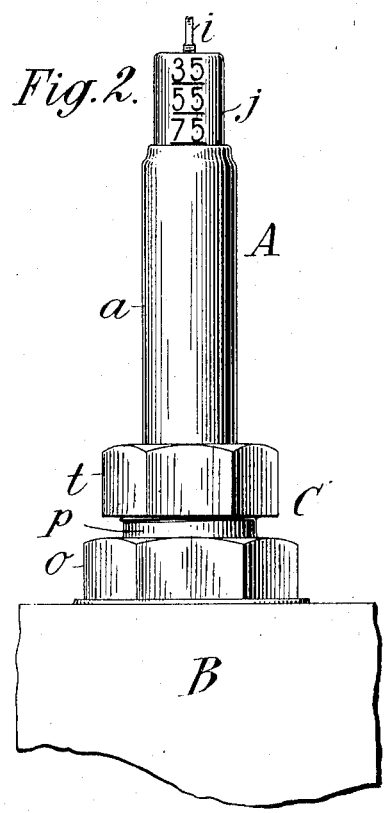
Fig. 2 is an elevation of Fig. 1.
Figure 3:
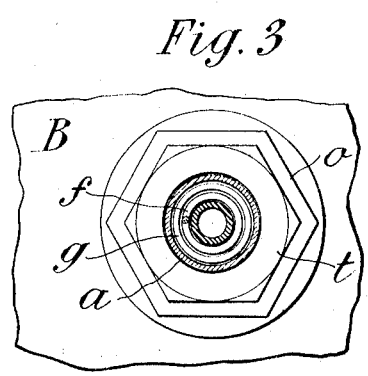
Fig. 3 is a horizontal section on the line 3—3 in Fig. 1.

Referring to Figs. 1 to 3, let A indicate the gage proper, B a wall of an engine cylinder or the like, and C a coupling connection or fitting between the gage and such wall.

Referring first to the gage A, that shown comprises a casing $a$ having at its lower end a packing $b$ which is designed to fit over the end of a valve shell and provide a temporary air-tight joint between the casing and the shell. The packing $b$ is provided with a central aperture into which extends a projection $c$ which is designed to push down a deflating pin of a tire. The projection $c$ is carried upon a disk $d$, the projection and disk being formed with a small passageway through which air from the tire is led to the interior of a rubber sleeve $e$ which is preferably closed at its top and constitutes an extensible chamber designed to expand and contract with the pressure. Surrounding the sleeve $e$ is a loading spring $f$, the lower end of which is connected to a screw plug $g$ and the upper end of which is connected to a plunger $h$. Surrounding the spring $f$ is a sleeve $j$ which is arranged to slide telescopically in the casing $a$ and which is provided with a suitable friction ring or other similar device $k$ by means of which it tends to retain its position at any point to which it may be moved. The plunger $h$ is not normally connected with the sleeve but pushes against the under side of the latter when the extensible sleeve $e$ is expanded. The top of the sleeve is, however, provided with a screw-threaded opening and the top of the plunger is provided with a screw-threaded socket, by means of which the plunger and sleeve may be connected by a thumb-screw $i$ or other suitable device if desired. In normal operation when the gage is applied to a pneumatic tire or other similar device and pressure enters the expansion sleeve, the plunger $h$ is pushed upwardly against the tension of its spring thereby moving the sleeve to a distance corresponding to the amount of pressure within the tire. When the gage is removed from the tire the plunger is retracted by its spring and the sleeve $j$ which during this operation is disconnected from the plunger remains at the highest position to which it has been moved. The sleeve is preferably provided with a scale and the upper part of the casing $a$ is preferably utilized as a pointer for reading the pressures.

My invention provides a means for making a leak-tight joint between the gage just described or other gage and the cylinder of an engine. The means for effecting this result necessarily depend somewhat upon the type of engine, etc., but in the drawing I have shown my invention as applied to a gas engine. The most accessible opening through which to apply the gage in a gas engine is the tapped hole through which the spark plug is inserted into the cylinder, although any other opening may be used or a special opening may be provided in the cylinder for this purpose.

In the drawings I have shown a tubular plug or fitting $m$ which is provided at its lower end with a screw-threaded shank $n$ designed to screw into the engine cylinder, wrench faces $o$ being provided for this purpose. The upper part of the plug or fitting is formed with a reduced portion or shank $p$ which is screw-threaded on its exterior. The lower part of the casing $a$ of the gage is formed with an outwardly extending flange $r$ which is adapted for engagement with a flange $u$ of a coupling $t$, which coupling is adapted to screw upon the portion $p$ of the plug. Any other suitable means of connecting the plug with the gage may be provided.

The bore of the plug $m$ is preferably small, and the plug is preferably provided with a nipple $x$ through which the upper end of the bore extends, which nipple enters the lower end of the gage, and makes a tight joint with the packing $b$, as shown. The packing $b$ is preferably under little or no compression until it is pressed on a valve shell or nipple, and hence the provision of the nipple $x$ is desirable.

In order to provide for a complete separation of the gage from the coupling member, the coupling sleeve $t$ is formed with an opening of sufficient diameter to pass over any point in the gage except the flange $r$. This latter flange is useful not only for the purpose of connecting the gage with the coupling, but also when the gage is being used as a tire gage in that it provides a shoulder or ledge by means of which when the gage is pressed upon a tire valve it is prevented from slipping through the fingers of the user.

For convenience in ascertaining the pressure of tires, which is of frequent occurrence, the gage will be customarily detached from the coupling. When it is desired to ascertain the pressure in a cylinder of the engine or motor, the spark plug of the latter is removed and the coupling fitted over the gage and the plug $m$ screwed into the spark plug opening, a suitable gasket being interposed between the two. The engine will then be turned either by hand or by the other cylinder if the engine has two or more cylinders, whereupon the degree of compression in the dead cylinder may be ascertained. When the plunger of the gage is forced to the point corresponding with the pressure, the indicating sleeve will be carried with it and will remain in its indicating position after the piston has returned to its lowermost position. If it is desired to test the capacity of a cylinder for maintaining its compression for a length of time, the thumb-screw is screwed downwardly until it engages the plunger so that the indicating sleeve and plunger are connected, thus forcing the sleeve to return with the plunger. Under these circumstances the engine is turned by hand until the piston in the cylinder to be tested reaches its highest point, where it is left the required length of time. If there is any leakage, the indicating sleeve will return more or less quickly to its lowermost position. By comparing the initial pressure with the resulting pressure after a lapse of time, the condition of the cylinder can be easily ascertained.

Figure 4:
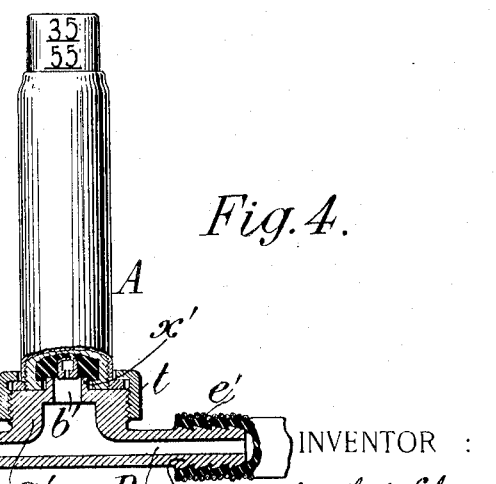
Fig. 4 is a sectional view of a modification.

The invention herein set forth is applicable to other purposes than those heretofore stated. In Fig. 4 I have illustrated a gage A provided with a coupling member $t$ which is shown as adapted to connect the gage to a pump connection D. In this construction the connection D has an upwardly extending branch $a'$ which is externally screw-threaded to receive the coupling $t$. Through the branch $a'$ extends a passage $b'$ which leads to a main passage $c'$ of the pump connection. At one end ($d'$) of the connection it is fitted to receive an air tube $e'$ while at the other end (which is preferably angular to the body of the connection) the fitting is provided with a coupling $f'$, or other means for attaching the connection to a tire valve. The branch $a'$ is preferably provided with a nipple $x'$ for making a tight joint with packing of the gage, as in Fig. 1. By making the parts standard the same gage A and coupling $t$ may be used in connection with the plug $m$, illustrated in Figs. 1 to 3.

While I have shown and described one embodiment of the invention, it will be understood that I do not wish to be limited to the construction set forth, since various changes may be made therein without departing from the invention.

The pressure gage per se herein disclosed is herein claimed only as having the removable coupling member $t$, the features of the gage apart from such coupling member being covered by claims in applications filed by M. C. Schweinert and H. P. Kraft, Serial No. 552111, filed March 28, 1910, and Serial No. 712,724, filed August 1, 1912, the particular form herein illustrated, apart from the removable coupling member, being shown and claimed in the latter application.

What I claim is:—

1. The combination of a pressure gage and a fitting adapted to connect said gage to the cylinder of a gas engine or the like, said gage having a packing attached thereto at one end adapted to fit against said fitting when applied to an engine and to make a contact-connection with a tire-valve when disconnected from said fitting.

2. The combination of a pressure gage and a fitting adapted to connect said gage to the cylinder of a gas engine or the like, said gage having a packing chamber at one end, a packing in said chamber adapted to fit against said fitting when applied to an engine and to make a contact-connection with a tire-valve when disconnected from said fitting.

3. The combination of a pressure gage and a fitting adapted to connect said gage to the cylinder of a gas engine or the like, said gage having a packing chamber at one end, a packing in said chamber adapted to fit against said fitting when applied to an engine and to make a contact-connection with a tire-valve when disconnected from said fitting, said fitting having a nipple or lead $x$ of substantially the same size as the end of a tire valve adapted to project into contact with said packing.

4. The combination of a pressure gage and a fitting adapted to connect said gage to a cylinder of a gas engine or the like, said gage comprising a casing having a flange at one end, and said fitting comprising a swivel collar adapted to engage said flange and to slip off said casing at the end opposite said flange.

5. A pressure gage having a pressure member and an indicating member, said members being normally disconnected, and means for connecting said members whereby said indicating member may partake of the expansive and contractile movements of said pressure member.

6. A pressure gage having a pressure member and an indicating member, said members being normally disconnected, and a thumb screw or the like for connecting said members.

7. A pressure gage having a pressure member and an indicating member, said members being normally disconnected, and a thumb screw passing through said indicating member and adapted to engage said pressure member for connecting said members together.

8. A pressure gage having a pressure member in the form of a plunger, an indicating sleeve adapted to be moved by said pressure member, said plunger and sleeve being normally disconnected, and means for connecting said members.

9. A pressure gage having a pressure member in the form of a plunger, an indicating sleeve adapted to be moved by said pressure member, said plunger and sleeve being normally disconnected, and means for connecting said members, comprising a thumb screw at the end of said indicating sleeve adapted to engage said plunger.

10. A pressure gage having a straight tubular casing, an indicating member, and having at one end means for moving the valve proper of a pneumatic tire to a deflating position, and having at such end a flange, and a coupling sleeve fitting over said flange removable from said casing and adapted to connect said gage to a screw threaded part of a separate structure.

11. A connection adapted to receive fluid pressures, having between its inlet and outlet a screw-threaded portion and a nipple adapted to enter a gage, and a threaded coupling member $t$ adapted to engage said screw-threaded portion for holding said gage thereon.

12. The combination with a pressure gage having a packing adapted to fit the end of a pneumatic tire valve to make a tight joint therewith, and a fitting adapted to fit into a gas engine cylinder, and means for connecting such pressure gage to such fitting.

13. The combination with a pressure gage having a packing adapted to fit the end of a pneumatic tire valve to make a tight joint therewith, and a fitting adapted to fit into a gas engine cylinder, and means for connecting such pressure gage to such fitting, said gage and fitting having packing means adapted to make a tight joint between the two.

14. A coupling device for joining a pressure gage to an engine cylinder, said coupling having means for attaching a gage thereto, and means for engaging an engine cylinder, said gage-attaching means comprising a nipple adapted to contact with the packing of a gage.

15. A coupling device for joining a pressure gage to an engine cylinder, said coupling having means for attaching a gage thereto, and means for engaging an engine cylinder, said gage-attaching means comprising a nipple adapted to contact with the packing of a gage, said coupling having a clearance around said nipple for the end of said gage, permitting a packing joint to be made between said nipple and gage packing.

16. A coupling device for joining a pressure gage to an engine cylinder, said coupling having means for attaching a gage thereto, and means for engaging an engine cylinder, said gage-attaching means comprising a nipple adapted to contact with the packing of a gage, said engine-cylinder engaging means comprising a screw threaded plug, adapted to screw within a screw threaded socket of said cylinder.

17. A pressure gage having a fluid passage-way, two connections for conecting said fluid passage-way with a source of pressure, said connections being of different character, one being adapted to make a tight joint with a pneumatic tire valve, and the other being constructed to connect the spark plug hole of an engine cylinder, or the like.

In witness whereof, I have hereunto signed my name in the presence of two subscribing witnesses.

MAXIMILIAN CHARLES SCHWEINERT.

Witnesses:
EUGENE V. MYERS,
THOMAS F. WALLACE.